(12) United States Patent
Kasai (10) Patent No.: US 6,272,570 B1
(45) Date of Patent: Aug. 7, 2001

(54) IC MEMORY CARD

(75) Inventor: Tsuneharu Kasai, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/194,584

(22) PCT Filed: Jun. 4, 1997

(86) PCT No.: PCT/JP97/01897

§ 371 Date: Nov. 30, 1998

§ 102(e) Date: Nov. 30, 1998

(87) PCT Pub. No.: WO97/46967

PCT Pub. Date: Dec. 11, 1997

(30) Foreign Application Priority Data

Jun. 4, 1996 (JP) .................................................. 8-141836

(51) Int. Cl.[7] .............................. G06K 19/00; G06F 13/00
(52) U.S. Cl. ...................................... 710/74; 710/2; 711/2; 361/737
(58) Field of Search .............................. 361/737; 710/2–4, 710/72–74, 101–103, 36–34; 711/1–5

(56) References Cited

U.S. PATENT DOCUMENTS

| | | | |
|---|---|---|---|
| 4,829,169 | * | 5/1989 | Watanabe ............................. 235/492 |
| 5,131,091 | * | 7/1992 | Mizuta ................................. 713/200 |
| 5,303,198 | * | 4/1994 | Adachi et al. .................... 365/185.11 |
| 5,388,248 | * | 2/1995 | Robinson et al. ..................... 365/52 |
| 5,436,621 | * | 7/1995 | Macko et al. ..................... 340/825.44 |
| 5,594,680 | * | 1/1997 | Ohtake et al. ........................ 365/63 |
| 5,751,886 | * | 5/1998 | Komine ................................ 386/48 |
| 5,761,732 | * | 6/1998 | Shaberman et al. ................. 711/157 |
| 5,818,029 | * | 10/1998 | Thomson ............................. 235/486 |

FOREIGN PATENT DOCUMENTS

| | | |
|---|---|---|
| 4-262433 | 9/1992 | (JP) . |
| 5-134820 | 6/1993 | (JP) . |
| 7-296132 | 11/1995 | (JP) . |
| 8-147438 | 6/1996 | (JP) . |
| WO 95/16238 | 6/1995 | (WO) . |

OTHER PUBLICATIONS

"General Purpose Personal Computer Memory Card International Association Interface ASIC for PC–Cards"; IBM Technical Disclosure Bulletin; vol. 37 No. 9, Sep. 1994, pp. 515–517.

"IC Memory Card Guideline Ver. 4.1 (in Japanese);" Japan Electronic Industry Development Association (Tokyo) Sep. 1991, p. 46–87.

* cited by examiner

Primary Examiner—Christopher B. Shin
(74) Attorney, Agent, or Firm—Smith, Gambrell & Russell, LLP (57) ABSTRACT

An IC memory card having an expanded function of transmitting and receiving special data other than preservative data. The IC memory card comprises an odd attribute control circuit for outputting a control signal for an odd-numbered address area of an attribute memory, a data storage circuit capable of transmitting and receiving the data other than preservative data to and from the odd-numbered address area of the attribute memory, a signal selection circuit for selecting signals for accessing the data storage circuit, and a special operation circuit which operates in accordance with data stored in the data storage circuit.

3 Claims, 7 Drawing Sheets

IC MEMORY CARD

TECHNICAL FIELD

The present invention relates to an IC memory card for transmitting and receiving data to and from an external system via an interface conformable to PCMCIA memory card specification, and more particularly to an IC memory card having an expanded function in addition to a data storage function.

BACKGROUND ART

Figure 7:
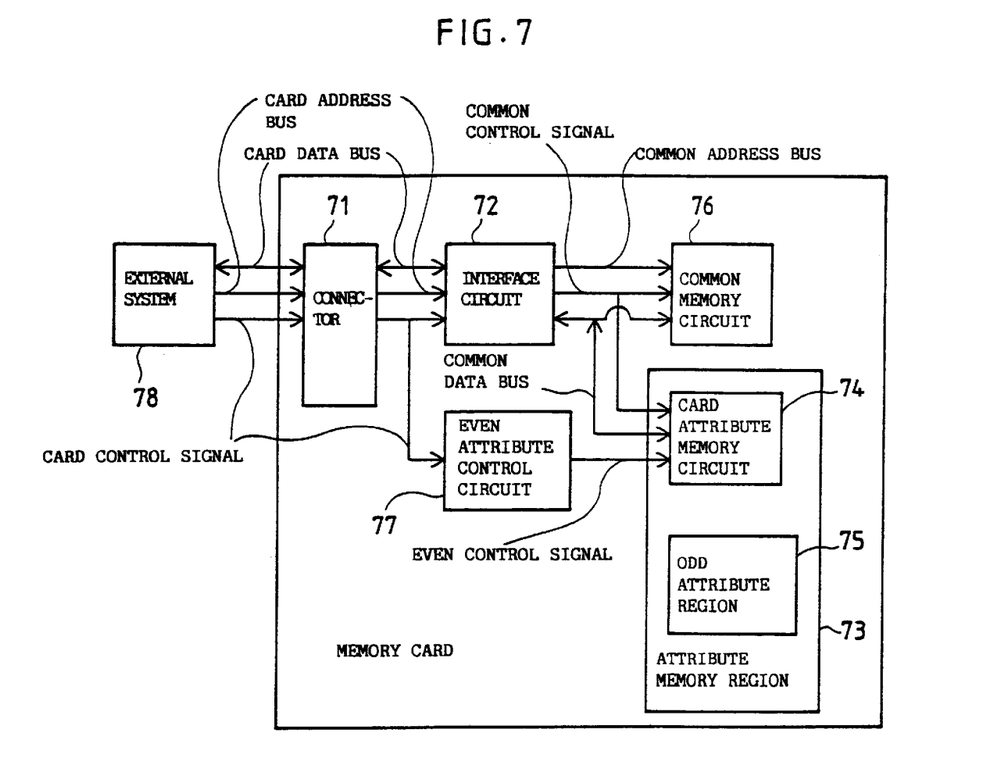
FIG. 7 is a block diagram showing a conventional IC memory card by way of example.

In conventional IC memory cards operating in conformity with the PCMCIA memory card specification, as shown in FIG. 7, only accesses to a common memory circuit 76 and a card attribute memory circuit 74 located at even-numbered addresses of an attribute memory region 73 which stores an attribute of the IC memory card are made effective, and the IC memory card operates by exchanging effective data. An external system 78 is allowed to access the common memory circuit 76 and the card attribute memory circuit 74 via a connector 71, an interface circuit 72 and an even attribute control circuit 77, but an access to an odd attribute region 75 is made disable and there is provided no function accessible to this region.

However, with the above arrangement, when a function other than the data storage function is to be performed by sending data other than preservative data such as special data or commands to the IC memory card, no distinction can be made between the preservative data and the special data because of an obstacle that only transmission and reception of the data conformable to the specification are effective, and therefore there arises a problem that it is difficult to transmit and receive the special data without affecting the inherent functions.

DISCLOSURE OF INVENTION

An object of the present invention is to provide an IC memory card capable of transmitting and receiving special data other than preservative data, to thereby realize functions other than the data storage function.

An IC memory card of the present invention comprises: a connector for connecting with an external system; an interface circuit for transmitting and receiving data to and from the external system through the connector using a card address signal, a card data signal and a card control signal; a common memory circuit for transmitting and receiving signals through the interface circuit to store therein preservative data from the external system; an attribute memory region to be accessed by the external system so as to identify a type of the IC memory card; a card attribute memory circuit located at even-numbered addresses of the attribute memory region and storing card attribute information; an even attribute control circuit for generating an even control signal for transmitting and receiving signals to and from the card attribute memory circuit; a special operation circuit for performing an operation different from the operation performed by the common memory circuit; a data storage circuit located at odd-numbered addresses in the attribute memory region and storing data to be transferred to the special operation circuit or data transferred from the special operation circuit; an odd attribute control circuit for generating an odd control signal for controlling the data storage circuit based on the card control signal; and a signal selection circuit for selecting the card control signal outputted from the external system, a common address signal and a common data signal inputted and outputted through the interface circuit to access the data storage circuit in response to the odd control signal, and for selecting a special operation control signal outputted from the special operation circuit, a special operation address signal and a special operation data signal to access the data storage circuit in response to a special operation select signal outputted from the special operation circuit.

With the data storage circuit provided in the IC memory card, the external system is enabled to send commands not conformable to the PCMCIA standard so that the IC memory card can perform expanded functions other than the data storage function in accordance with the commands.

BEST MODE OF CARRYING OUT THE INVENTION

Figure 1:
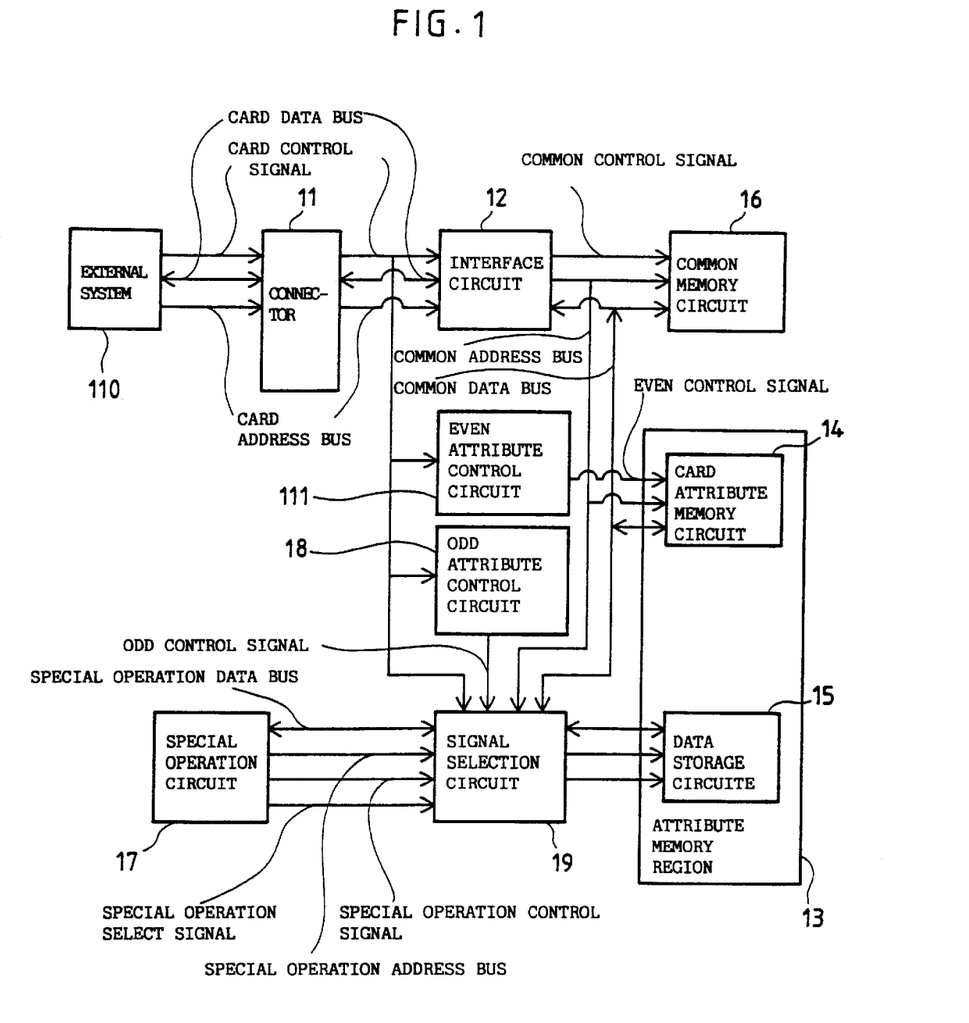
FIG. 1 is a block diagram showing an arrangement of an IC memory card according to an embodiment of the present invention.
Figure 2A:
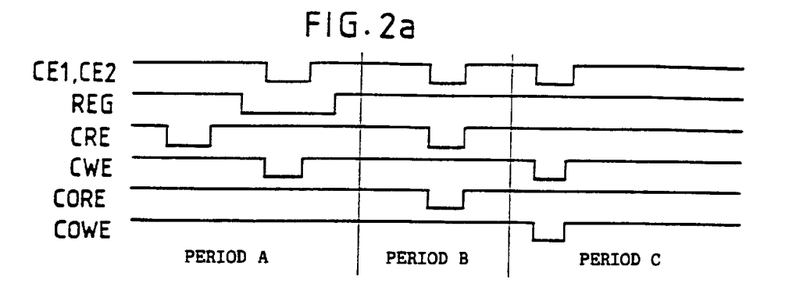
FIGS. 2a to 2c are timing charts showing an operation of the IC memory card shown in FIG. 1.
Figure 2B:
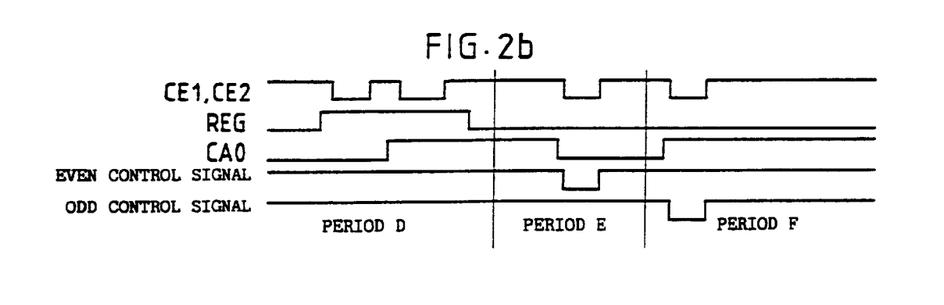
Figure 2C:
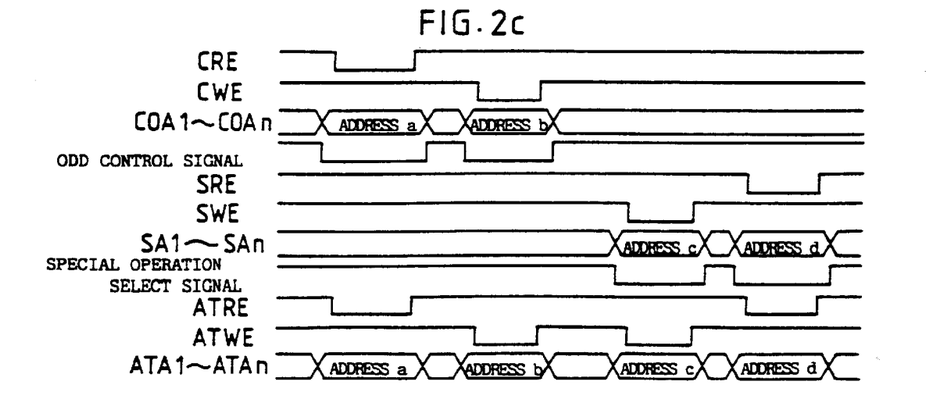

Referring to FIGS. 1 and 2, the arrangement and operation of an IC memory card according to one embodiment of the present invention will be described.

An external system (personal computer etc.) 110 connected to a connector 11 accesses an IC memory card via the connector 11 using card control signals including card enable signals CE1 and CE2, a function select signal REG, a card read enable signal CRE which is a read strobe signal, and a card write enable signal CWE which is a write strobe signal. When either the card enable signal CE1 or CE2 is at LOW level, it means that the external system 110 is accessing the IC memory card. The function select signal REG is set to HIGH level to indicate that a common memory circuit 16 of the IC memory card is being accessed, and is set to LOW level to indicate that an attribute memory region 13 is being accessed.

When the external system 110 accesses the common memory circuit 16, an interface circuit 12 generates, based on the card control signals, common control signals necessary for operating the common memory circuit 16, i.e., a common read enable signal CORE which is a read strobe signal for the common memory circuit 16, and a common write enable signal COWE which is a write strobe signal for the common memory circuit 16, as shown in FIG. 2a. Further, based on a card address signal and a card data signal outputted from the external system 110, the interface circuit 12 generates a common address signal and a common data signal to be used in the common memory circuit 16. As shown in periods B and C in FIG. 2a, while the signal CEI or CE2 is at LOW level and at the same time the signal REG is at HIGH level, the LOW level of the signal CRE is output as the common read enable signal CORE and the LOW level of the signal CWE is output as the common write enable signal COWE.

As shown in a period A in FIG. 2a, when the signals CE1 and CE2 are both at HIGH level or the signal REG is at LOW level, the signals CORE and COWE are fixed at HIGH level. The common memory circuit 16 operates in accordance with the common control signals, and outputs data to the external system 110 via the connector 11 when required.

In the period B, for example, when the signal CORE is at LOW level, the common memory circuit 16 outputs to a common data bus the data at an address specified by a card address signal then output from the external system 110. In the period C, when the signal COWE rises, the common memory circuit 16 writes data therein at an address specified by a card address signal from the external system 110.

An access to the attribute memory region 13 is shown in FIG. 2b. An even attribute control circuit 111 and an odd attribute control circuit 18 respectively generate an even control signal and an odd control signal which are necessary for accessing the attribute memory region 13, based on the card control signals. As shown in a period E, when the signal CE1 or CE2 is at LOW level and also the signal REG is at LOW level and at the same time the least significant bit (card address signal CA0) of a card address bus is at LOW level, an even-numbered address area of the attribute memory region 13 is accessed and the even control signal for a card attribute memory circuit 14 is set at LOW level, so that access to the address area is permitted (enabled).

A period F shows an access to an odd-numbered address area. When the signal CE1 or CE2 is at LOW level and also the signal REG is at LOW level and at the same time the card address signal CA0 is at HIGH level, the odd control signal for accessing a data storage circuit 15 is enabled. While the signal REG is at HIGH level as in a period D, the even and odd control signals are both fixed at HIGH level.

When the odd control signal is enabled, a signal selection circuit 19 selects the card control signals, such as the common address signal and common data signal outputted from the interface circuit 12 and the card read enable signal CRE and the card write enable signal CWE outputted from the external system 110, and permits the external system 110 to access the data storage circuit 15.

As shown in FIG. 2c, when the odd control signal is at LOW level, the card read enable signal CRE, the card write enable signal CWE and the common address signals COA1 to COAn except the least significant bit are selected. When a special operation select signal is outputted from a special operation circuit 17, the signal selection circuit 19 selects a special operation address signal, a special operation data signal and special operation control signals, which are outputted from the special operation circuit 17. The special operation data signal and the special operation control signals are a special operation read enable signal SRE which is a read strobe signal and a special operation write enable signal SWE which is a write strobe signal. Thereby, the special operation circuit 17 is allowed to access the data storage circuit 15. Accordingly, the special operation circuit 17 can read and write data from and into the data storage circuit 15.

Figure 3:
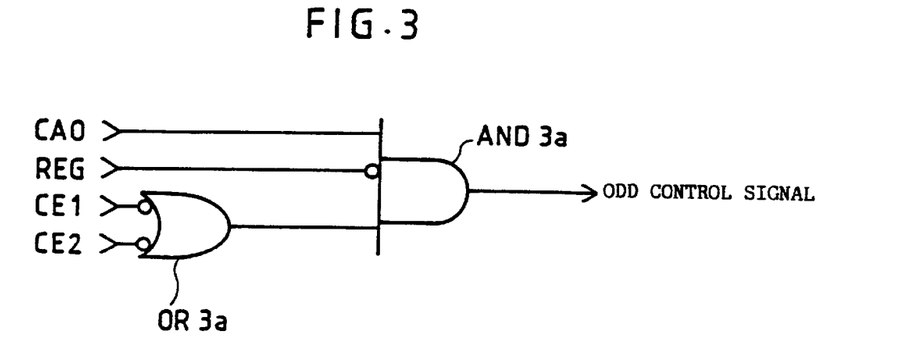
FIG. 3 is a circuit diagram showing an odd attribute control circuit shown in FIG. 1.

Referring now to FIGS. 3 through 6, the arrangement of the individual circuits will be explained in more detail. FIG. 3 shows an example of the odd attribute control circuit 18 according to the invention. The signals CA0, REG, CE1 and CE2 are for the PCMCIA interface. The odd control signal turns to HIGH level only when the card enable signal CE1 or CE2 is at LOW level, the card address signal CA0 is at HIGH level and the signal REG is at LOW level, and is outputted from an AND gate 3a.

Figure 4:
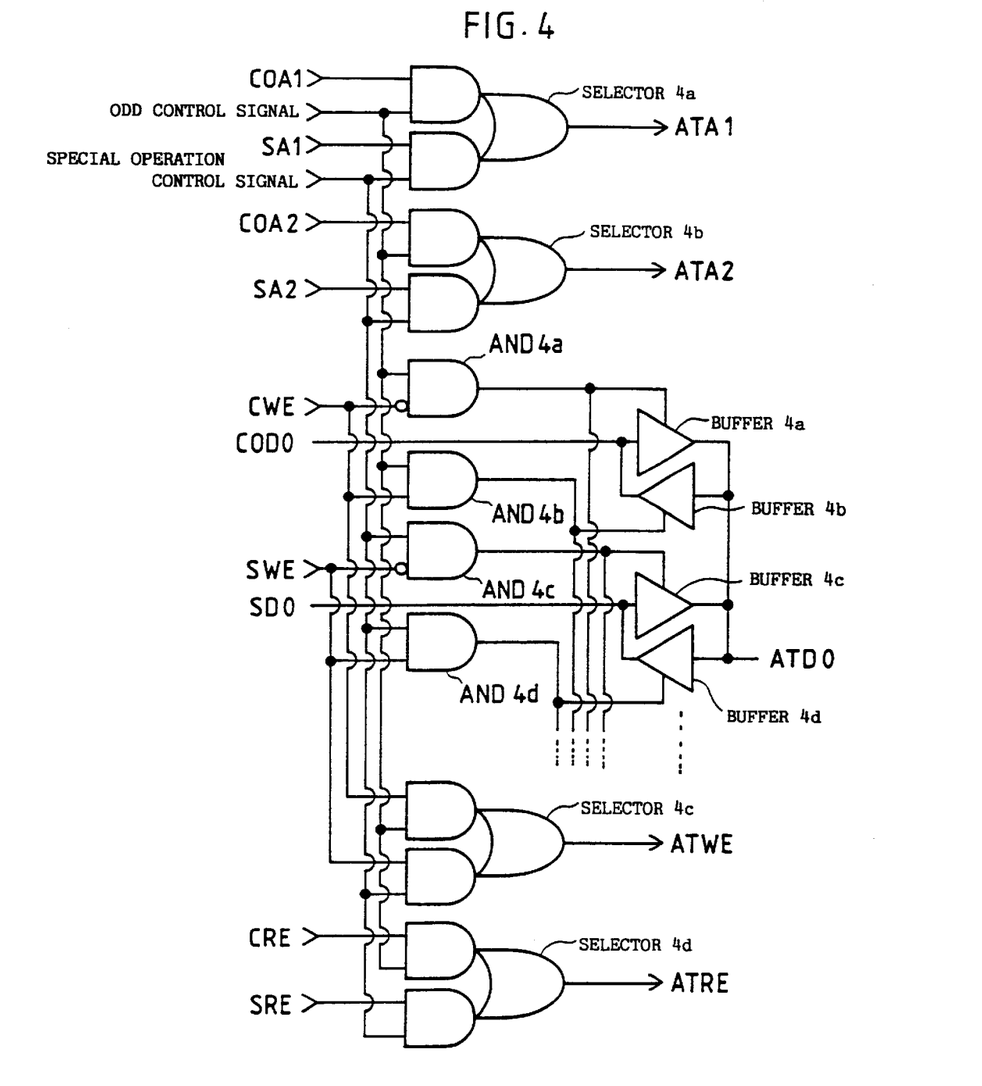
FIG. 4 is a circuit diagram showing a signal selection circuit shown in FIG. 1.

FIG. 4 illustrates an example of the signal selection circuit 19. The common address signals COA1 and COA2 are the bit "1" and the bit "2", respectively, of a common address bus, and the special operation address signals SA1 and SA2 are the bit "1" and the bit "2", respectively, of a special operation address bus to be outputted when the special operation circuit 17 accesses the data storage circuit 15. The card write enable signal CWE, the card read enable signal CRE, the special operation write enable signal SWE and the special operation read enable signal SRE are the write strobe signal and the read strobe signal from the external system 110, and the write strobe signal and the read strobe signal from the special operation circuit 17, respectively.

The common address signals COA1 and COA2, the card write enable signal CWE and the card read enable signal CRE are selected via selectors 4a, 4b, 4c and 4d when the odd control signal is at HIGH level, and are outputted as odd attribute address signals ATA1 and ATA2, an odd attribute write enable signal ATWE and an odd attribute read enable signal ATRE, respectively. When the special operation select signal is at HIGH level, the special operation address signals SA1 and SA2, the special operation write enable signal SWE and the special operation read enable signal SRE are selected. In this embodiment, the address signals occupy two bits, but where the number of bits is larger, as many selectors as the number of address signals are provided. Also, in a circuit requiring an additional signal such as a chip select signal, a selector is provided in the similar manner to permit selection of the signal from the external system 1 10 or the signal from the special operation circuit 17. The data signals are also selected with the use of the odd control signal and the special operation select signal.

When the odd control signal is at HIGH level and the card write enable signal CWE is at LOW level, a buffer 4a turns ON and the least significant bit (common data signal D0) of the common data bus, which is a data signal of the external system 110, is outputted as an odd attribute data signal ATD0, so that the external system 110 can write data in the data storage circuit 15. When the odd control signal is at HIGH level and the card write enable signal CWE is at HIGH level, a buffer 4b turns ON and the odd attribute data signal ATD0 is outputted as a common data signal COD0, so that the external system 110 can read data from the data storage circuit 15. On the other hand, when the special operation select signal is at HIGH level and the special operation write enable signal SWE is at LOW level, a buffer 4c turns ON and the least significant bit (special operation data signal SD0) of a special operation data bus, which is a data signal of the special operation circuit 17, is outputted as the odd attribute data signal ATD0, so that the special operation circuit 17 can write data in the data storage circuit 15. When the special operation select signal is at HIGH level and the special operation write enable signal SWE is at HIGH level, a buffer 4d turns ON and the odd attribute data signal ATDO is outputted as the special operation data signal SD0, so that the special operation circuit 17 can read data from the data storage circuit 15. In the case where the data signal consists of 8 bits, selection circuits for odd attribute data signals ATD1 to ATD7 can be implemented by similar circuit arrangement.

Figure 5:
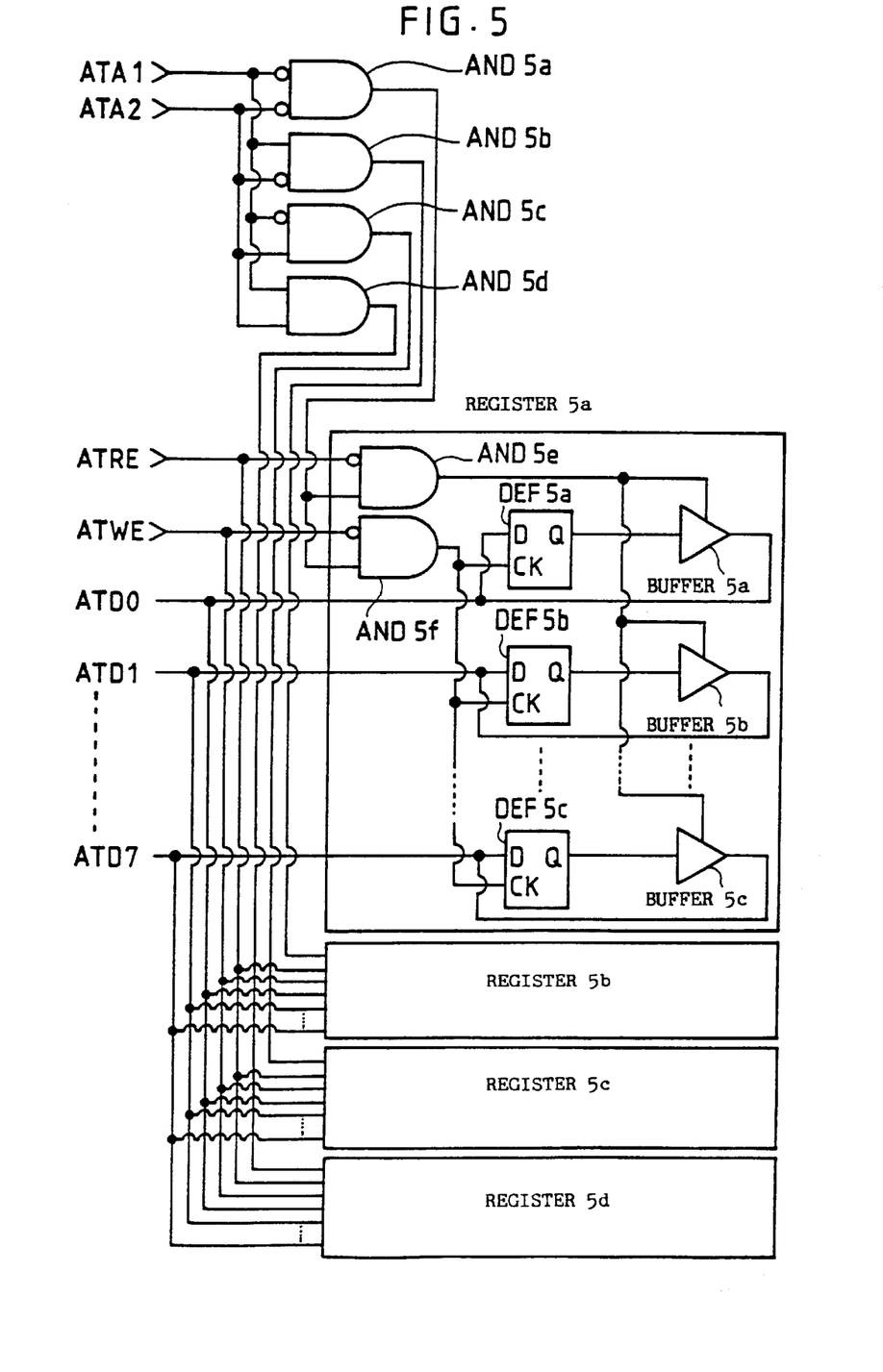
FIG. 5 is a circuit diagram showing a data storage circuit shown in FIG. 1.

The data storage circuit 15 will be described referring to FIG. 5. The data storage circuit 15 comprises AND gates 5a–5d for decoding a 2-bit address therefor and registers 5a–5d selected in accordance with signals generated by the AND gates. When the odd attribute address signals ATA1 and ATA2 are both at LOW level, a HIGH-level signal is outputted from the AND gate 5a, permitting access to the register 5a. The registers 5b–5d are accessed in the same manner in accordance with the levels of the odd attribute address signals ATA1 and ATA2. Although four registers are used in this embodiment, the number of registers may be increased by increasing the number of address signals. Each register comprises eight D flip-flops represented by DFFs 5a–5c, eight three-state buffers represented by buffers 5a–5c, and AND gates 5e and 5f. When the external system 110 or the special operation circuit 17 writes data in the register 5a, the card address signals CA1 and CA2 or the special operation address signals SA1 and SA2 are both set at LOW level, so that the odd attribute address signals ATA1 and ATA2 turn to LOW level. While in this state, the odd attribute data signals ATD0–ATD7 are taken in the DFFs 5a–5c at the time when the odd attribute write enable signal ATWE turns from LOW level to HIGH level.

When reading data, the odd attribute read enable signal ATRE is set at LOW level to turn the buffers 5a–5c ON, whereby data retained by the DFFs 5a–5c are outputted to the lines of the odd attribute data signals ATD0–ATD7. The registers 4b–4d respectively perform a similar operation. In this embodiment, the data storage circuit 15 is constituted by D flip-flops, but may be any other read/write device such as SRAM, flash memory, EEPROM, latch circuit or the like. In the case where data stored need not be altered, a read-only device such as PROM, mask ROM or the like may be used.

Figure 6:
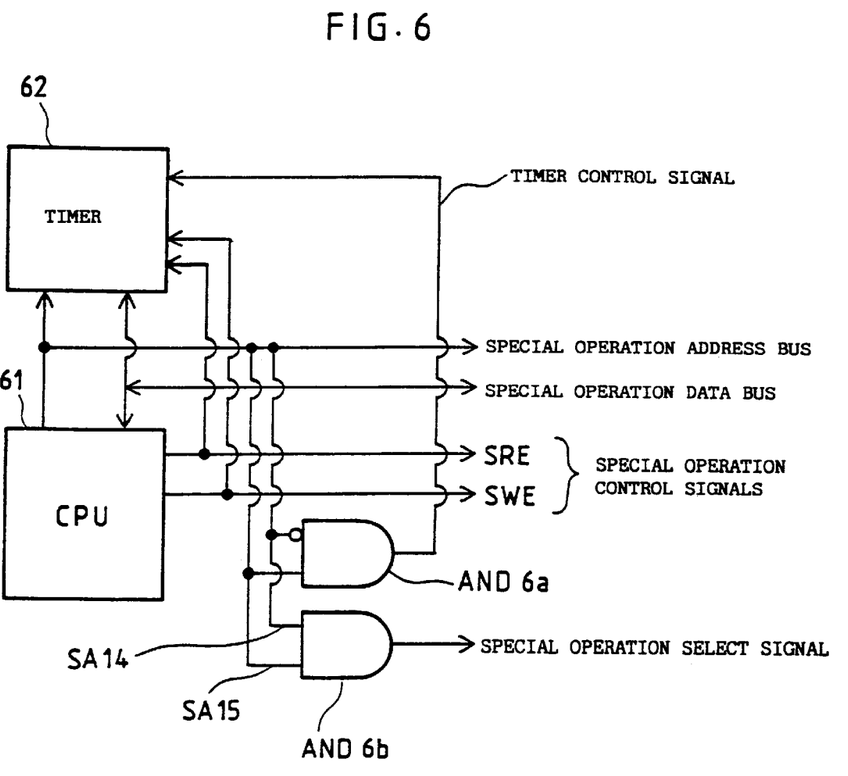
FIG. 6 is a diagram showing an arrangement of a special operation circuit shown in FIG. 1.

The special operation circuit 17 will be described referring to FIG. 6. In this embodiment, a timer function of measuring time elapsed from a set point of time is exemplified as a function of the special operation circuit 17. Assuming that timer setting data has been written in the data storage circuit 15 from the external system 110, a CPU 61 first outputs the special operation address signals SA0–SA15. The special operation address signals SA14 and SA15 outputted in this case are set at HIGH level to thereby turn the special operation select signal to HIGH level via an AND gate 6b, so that the signal selection circuit 19 selects signals from the special operation circuit 17. Also, in accordance with the combination of the levels, HIGH or LOW, of the special operation address signals SA1 and SA2 of the special operation address bus, one of the four registers in the data storage circuit 15 is selected. Subsequently, the special operation read enable signal SRE is set at LOW level, whereby the timer setting data is outputted from the selected register to the special operation data bus.

To set the timer setting data thus read out in a timer 62, the CPU 61 outputs a LOW-level signal as the special operation address signal SA14 and a HIGH-level signal as the special operation address signal SA15. Consequently, a timer control signal outputted from an AND gate 6a turns to HIGH level, so that the timer 62 is selected. Simultaneously, HIGH- and LOW-level signals are outputted as the special operation address signals SA0–SA13 to select a specified one of a plurality of registers in the timer 62, and the data read from the data storage circuit 15 is outputted to the special operation data bus. The CPU 61 then sets the special operation write enable signal SWE at LOW level, whereby the data is written in the selected register in the timer 62. The timer 62 starts time measuring operation from the point of time as specified by the data set therein. In the above description of the embodiment, reading data from the data storage circuit 15 and writing data in the timer 62 are explained, but writing data in the data storage circuit 15 and reading data from the timer 62 can be carried out in the similar manner.

According to the present invention, special data can be sent from a personal computer, and accordingly, where the IC memory card has a timer function, timer setting data can be sent to the card. In the case where the IC memory card has a function of displaying the contents of data stored therein, a password may be previously sent to and set in the IC memory card so that the IC memory card can perform a security function whereby no one can see the contents of data unless he/she enters the password. Further, a microcomputer having a built-in program which recognizes received program data may be provided in the IC memory card, and in this case, the expanded function of the IC memory card is replaceable.

Since data can be transferred from the IC memory card to a personal computer, the IC memory card may have a serial communication function so that it can perform a second function independently, such as a function of sending data received from an external device to the personal computer, etc.

What is claimed is:

1. An IC memory card for transmitting and receiving data to and from an external system, comprising:

a connector for connecting with said external system;

an interface circuit for transmitting and receiving data to and from said external system through said connector using a card address signal, a card data signal and a card control signal;

a common memory circuit for transmitting and receiving signals through said interface circuit to store therein preservative data from said external system;

an attribute memory region to be accessed by said external system so as to identify a type of the IC memory card;

a card attribute memory circuit located at even-numbered addresses of said attribute memory region and storing card attribute information;

an even attribute control circuit for generating an even control signal for transmitting and receiving signals to and from said card attribute memory circuit;

a special operation circuit for performing an operation different from the operation performed by said common memory circuit;

a data storage circuit located at odd-numbered addresses in said attribute memory region and storing data to be transferred to said special operation circuit or data transferred from said special operation circuit;

an odd attribute control circuit for generating an odd control signal for controlling said data storage circuit based on the card control signal; and a signal selection circuit for selecting the card control signal outputted from said external system, a common address signal and a common data signal inputted and outputted through said interface circuit to access said data storage circuit in response to said odd control signal, and for selecting a special operation control signal outputted from said special operation circuit, a special operation address signal and a special operation data signal to access said data storage circuit in response to a special operation select signal outputted from said special operation circuit.

2. The IC memory card according to claim 1, wherein said special operation circuit transfers and receives data to and from said data storage circuit through said signal selection circuit.

3. The IC memory card according to claim 2, wherein said special operation circuit includes a timer which operates in accordance with the data stored in said data storage circuit.

* * * * *